United States Patent
Ngo et al.

(10) Patent No.: US 7,266,707 B2
(45) Date of Patent: Sep. 4, 2007

(54) DYNAMIC LEAKAGE CONTROL CIRCUIT

(75) Inventors: Hung C. Ngo, Austin, TX (US); Jente B. Kuang, Austin, TX (US); Kevin J. Nowka, Georgetown, TX (US); Rajiv V. Joshi, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 10/942,419

(22) Filed: Sep. 16, 2004

(65) Prior Publication Data

US 2006/0059376 A1    Mar. 16, 2006

(51) Int. Cl.
*G06F 1/00* (2006.01)

(52) U.S. Cl. .................. 713/300; 257/207
(58) Field of Classification Search ........... 713/300; 257/207
See application file for complete search history.

(56) References Cited

U.S. PATENT DOCUMENTS

| | | | |
|---|---|---|---|
| 6,208,171 B1 * | 3/2001 | Kumagai et al. | 326/121 |
| 6,255,853 B1 * | 7/2001 | Houston | 326/98 |
| 6,320,418 B1 * | 11/2001 | Fujii et al. | 326/93 |
| 6,590,424 B2 * | 7/2003 | Singh et al. | 326/93 |
| 6,707,317 B2 * | 3/2004 | Ebergen et al. | 326/95 |
| 6,784,726 B2 * | 8/2004 | Burr | 327/546 |
| 6,907,534 B2 * | 6/2005 | Ku | 713/320 |
| 2004/0008056 A1 * | 1/2004 | Kursun et al. | 326/96 |
| 2005/0083081 A1 * | 4/2005 | Jacobson et al. | 326/93 |

* cited by examiner

*Primary Examiner*—Thomas Lee
*Assistant Examiner*—Vincent T Tran
(74) *Attorney, Agent, or Firm*—Winstead PC

(57) ABSTRACT

A low power consumption pipeline circuit architecture has power partitioned pipeline stages. The first pipeline stage is non-power-gated for fast response in processing input data after receipt of a valid data signal. A power-gated second pipeline stage has two power-gated modes. Normally the power rail in the power-gated second pipeline stage is charged to a first voltage potential of a pipeline power supply. In the first power gated mode, the power rail is charged to a threshold voltage below the first voltage potential to reduce leakage. In the second power gated mode, the power rail is decoupled from the first voltage potential. A power-gated third pipeline stage has its power rail either coupled to the first voltage potential or power-gated where its power rail is decoupled from the first voltage potential. The power rail of the second power-gated pipeline stage charges to the first voltage potential before the third power-gated pipeline stage.

17 Claims, 6 Drawing Sheets

DYNAMIC LEAKAGE CONTROL CIRCUIT

GOVERNMENT RIGHTS

This invention was made with Government support under NBCH30390004 awarded by PERCS. The Government has certain rights in this invention.

CROSS-REFERENCE TO RELATED APPLICATIONS

The present invention is related to U.S. patent application Ser. No. 10/821,047, filed Apr. 8, 2004, entitled "AN INTERFACE CIRCUIT FOR COUPLING BETWEEN LOGIC CIRCUIT DOMAINS,"

U.S. patent application Ser. No. 10/821,048, filed Apr. 8, 2004, entitled "BUFFER/DRIVER CIRCUITS," and U.S. patent application Ser. No. 10/835,501, filed Apr. 29, 2004, entitled "SELF LIMITING GATE LEAKAGE DRIVER," which are incorporated by reference herein.

TECHNICAL FIELD

The present invention relates in general to complementary metal oxide semiconductor (CMOS) circuits and, in particular, to circuit methodologies for implementing power-gating to control power and leakage.

BACKGROUND INFORMATION

Oxide tunneling current in metal oxide silicon (MOS) field effect transistors (FET) is a non-negligible component of power consumption as gate oxides get thinner, and may in the future become the dominant leakage mechanism in sub-100 nm complementary MOS (CMOS) circuits. The gate current is dependent on various conditions for a single transistor and three main static regions of operation may be identified for a MOSFET. The amount of gate-leakage current differs by several orders of magnitude from one region to another. Whether a transistor leaks significantly or not is also affected by its position in relation to other transistors within a CMOS circuit structure as this affects the voltage stress to which a particular device is subjected.

The three regions of operation are a function of applied bias if one only considers the parameters that affect the magnitude of gate current in a MOSFET as it operates in relation to other MOSFETs. Assuming that the supply voltage (Vdd) and the threshold voltage (Vt) are fixed, then a MOSFET in a static CMOS logic gate operates in one to the three regions, each with a significantly different amount of gate leakage.

The first region is called "strong inversion" and is the region where a MOSFET operates with the absolute value of the gate to source voltage (|VGS|) equal to Vdd. The gate-leakage current density for an N-channel FET (NFET) in strong inversion may be as high as $10^3$ amperes square centimeter ($A/cm^2$) for an oxide thickness of 1.5 nanometers (nm) at Vdd equal to 3 volts (V). For such a thin oxide, a more realistic value for Vdd is 1.2 V, in which case the gate-leakage current would more likely be 20 $A/cm^2$.

The second region is called the "threshold" region where |VGS|=Vt. A MOSFET operating in the threshold region will leak significantly less than one operating in the strong inversion region, typically 3 to 6 orders of magnitude less depending on Vdd and the oxide thickness.

The third region is called the "Off" region where |VGS|=0.0 V. For an NFET operating in the Off region, there is no leakage if the drain voltage (Vd)=0.0 V. However, if Vd is equal to Vdd, then a small leakage current in the reverse direction (drain to gate) may be present due to gate-drain overlap area. Of course this current depends on transistor geometry and is typically 10 orders of magnitude less than the gate-leakage current in the strong inversion region.

The above three regions represent three distinct conditions or states for the channel of a MOSFET. Whether an "ON" transistor operates at strong inversion or at threshold is determined by its position inside a logic circuit structure as well as by the state of other transistors in the circuit structure.

Both NFETs and P-channel FETs (PFETs) in a logic circuit structure operate in one of the three regions described above. However, the main tunneling current in a PFET device in strong inversion is due to hole tunneling from the valence band and the main tunneling current in an NFET device in strong inversion is due to electron tunneling from the conduction band. Because of this, PFET gate currents are about 10 times smaller than equivalent sized NFET devices. This fact is important in assessing gate-leakage in a static CMOS circuit.

Since gate leakage currents are measured as current density, it follows that the gate-leakage current in a MOSFET is directly proportional to the gate area (width times length). Transistor sizing, therefore, has a direct impact on the amount of gate-leakage in a CMOS logic circuit.

As CMOS circuits become smaller, leakage current that results when voltage is applied to the gate of the field effect transistors becomes a significant portion of the power dissipation. Leakage power may become the limiting factor in how small devices may be manufactured. As devices are made smaller, the power supply voltage is correspondingly reduced. However, this may not achieve an adequate reduction in leakage power dissipation. Alternate techniques are being employed to reduce leakage power. One popular technique is to use power-gating to isolate the power supply voltage in groups of circuits at controlled times. These circuits are sometimes referred to as being part of a power-gated domain. Other circuits may be evaluating a logic function and may not be in a power-gated domain. Interfacing between circuits in a power-gated domain and circuits in a non-power-gated domain may prove difficult. The state of an output from a power-gated domain may be uncertain during the time period of power-gating. While the benefits of power-gating are known, there is no consensus on strategies to preserve logic states of outputs in the power-gated domains. Since power-gated domains may be variable, the method of preserving output logic states from circuits in a power-gated domain are controlled by the power-gating control signals themselves.

The current drive capability of a CMOS buffer depends on the channel size of devices used to drive outputs or to drive many other logic gate inputs. Therefore, one would expect the large devices to exhibit large gate-leakage current when the technology has gate oxides that are very thin. Likewise, logic regions with a high number of logic gates may exhibit a large gate-leakage current due to the large number of devices that are in strong inversion at any one static time (between clock transitions). Logic regions with a high number of logic gates may employ power supply gating whereby the power to the logic devices are decoupled by the action MOSFETs, PFETs for the positive power supply voltage and NFETs for the negative power supply voltage. These regions where power supply gating is employed is sometimes referred to as "cuttable" regions. When a cuttable region is interfaced with a non-cuttable region, then logic states at the interface outputs may become indeterminate when power is decoupled.

Pipeline circuits are configured such that data proceeds from an input latch point through sequential circuits to an output latch point. Because data proceeds through the sequential circuits in a time sequence, it would be advantageous to partition the sequential circuits in a pipeline such that different levels of power-gating may be employed that would allow performance to be maintained while also allowing selected circuit partitions to be "shut-down" using power gating depending on the validity of the input data and when the circuits will be needed for a valid pipeline process.

There is, therefore, a need for a power-gating circuit to control selected power-gating devices coupled to partitions in a pipeline such that the partitions may be dynamically powered or shut-down to control leakage power dissipation while maintaining pipeline performance.

SUMMARY OF THE INVENTION

A pipeline circuit is partitioned and has a plurality of sequential power-gated regions between an input latch point and an output latch point. Since data proceeds from the input latch point through circuitry in time sequence, the first pipeline circuit partition (closest to the input latch point) is not power-gated as it would take too much time to charge the power rail if a signal indicating a valid pipeline process was received. The second pipeline circuit has power-gating devices that allow the power rail to be either fully ON or softly ON. Since leakage is proportional to the applied voltage, a power device may be applied to the rail that drops the voltage on the rail a threshold voltage below its normal value. The main power gating device would be OFF in this mode allowing the "soft" power-gating to reduce leakage while allowing fast turn-ON of the power rail in the event a valid signal is received. The third pipeline circuit has complete power-gating that allows the power rail to be completely shut OFF. Since the third pipeline circuit has more time to turn ON, it can be fully power-gated. Latching circuitry may be employed on the valid signal to ensure the valid state is maintained. In one embodiment, the soft power gating device is controlled by a control signal from the power-gating control circuit. In another embodiment, the soft power-gating device is self-biased ON all the time. Registers are employed between the partitions to hold data during periods of power-gating where outputs of power-gated logic may have indeterminate outputs.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
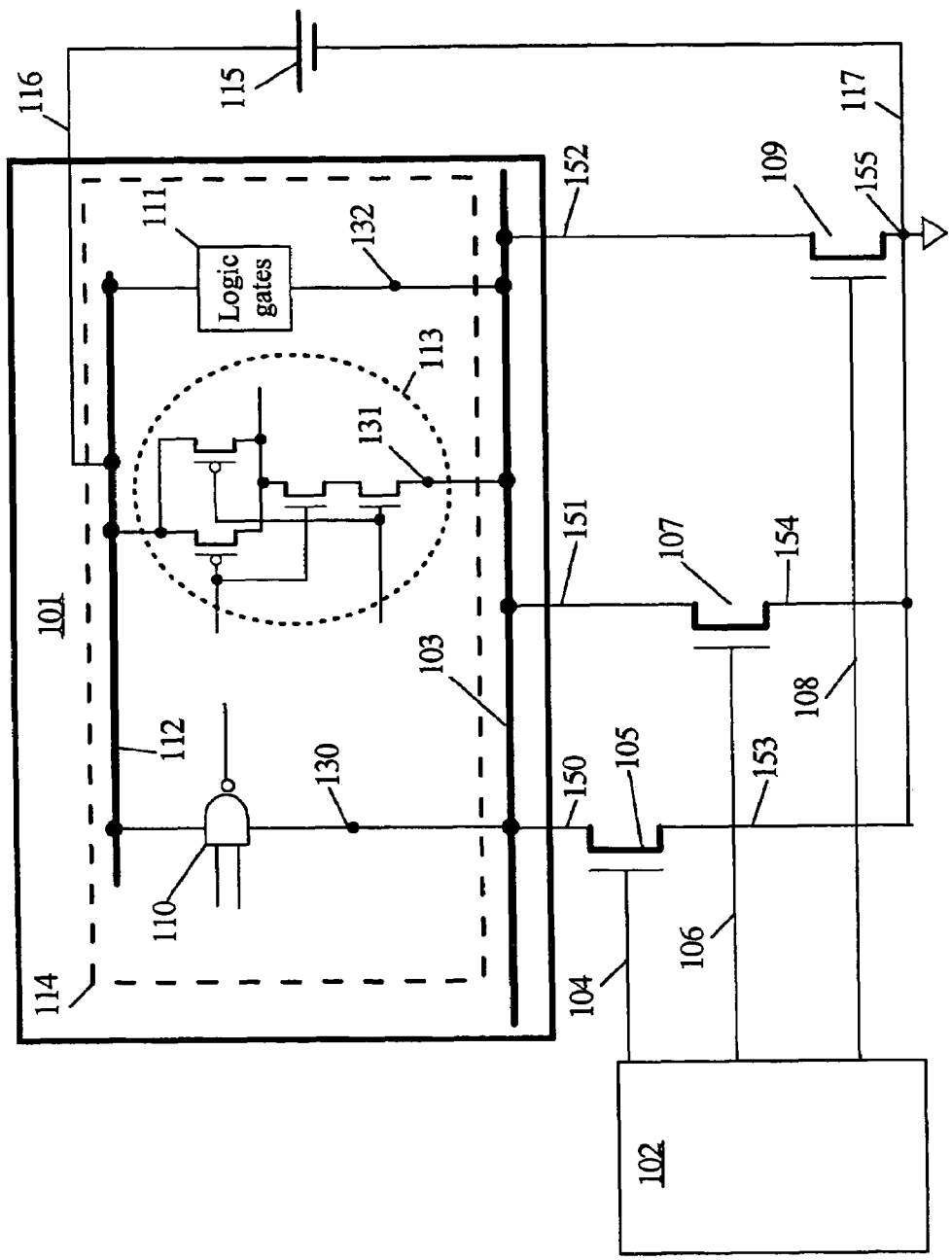
FIG. 1 is a circuit block diagram illustrating a basic topology of embodiments of the present invention for power-gating a virtual ground rail.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing, and the like have been omitted inasmuch as such details are not necessary to obtain a complete understanding of the present invention and are within the skills of persons of ordinary skill in the relevant art.

In the following, power supply voltage potentials are distributed to circuits on circuit traces or printed wires which may be referred to interchangeably as power supply rails, grids or buses. Power supply voltage potentials are coupled to the buses or grids to activate various logic circuitry. The power supply voltage potentials may be referred to simply as positive potential or ground potential. The "voltage" term may be dropped for simplicity with the understanding that all the potentials are voltage potentials. Embodiments of the present invention employ power-gating circuitry for generating "virtual" power supply rails (power rails) where switching devices couple and decouple the power rails from the power supply potential. The term virtual may be dropped to simplify circuit descriptions.

Refer now to the drawings wherein depicted elements are not necessarily shown to scale and wherein like or similar elements are designated by the same reference numeral through the several views.

FIG. 1 is a block circuit diagram of power-gating according to embodiments of the present invention. A logic circuit domain 101 has a virtual low (ground) power supply rail or bus (VGR) 103 that is coupled to the ground nodes 130-132 of selected circuits 110, 111, and 113 in domain 101. Logic circuit 113 illustrates the FETs making up its logic function. Power supply 115 has positive voltage potential 116 coupled directly to bus 112 and ground voltage potential 117. The VGR 103 is selectively coupled to the power supply ground voltage potential 117 with parallel N channel field effect transistor (NFET) devices 105, 107, and 109 operating as electronic switches. NFETs 105, 107, and 109 have nodes 150-152, respectively, coupled to VGR 103 and nodes 153-154, respectively, coupled to ground voltage potential 117. The NFETs 105, 107, and 109 are controlled by logic signals 104, 106, and 108, respectively. Logic signals 104, 106, and 108 are generated in logic domain 102 with non power-gated circuitry. In this manner, VGR 103 may be coupled to ground potential 117 with various degrees of conductivity.: Large devices have higher conductivity but generally display higher leakage. Smaller devices have lower conductivity but display lower leakage. In this manner, some or all of parallel connected NFETs 105, 107, and 109 may be gated ON when there is a high degree of switching in domain 101 requiring speed in arriving at a logic output in response to logic inputs. Once an output is determined in domain 101, selective ones of NFETs 105, 107, and 109 may be gated OFF thus reducing leakage power.

Figure 2:
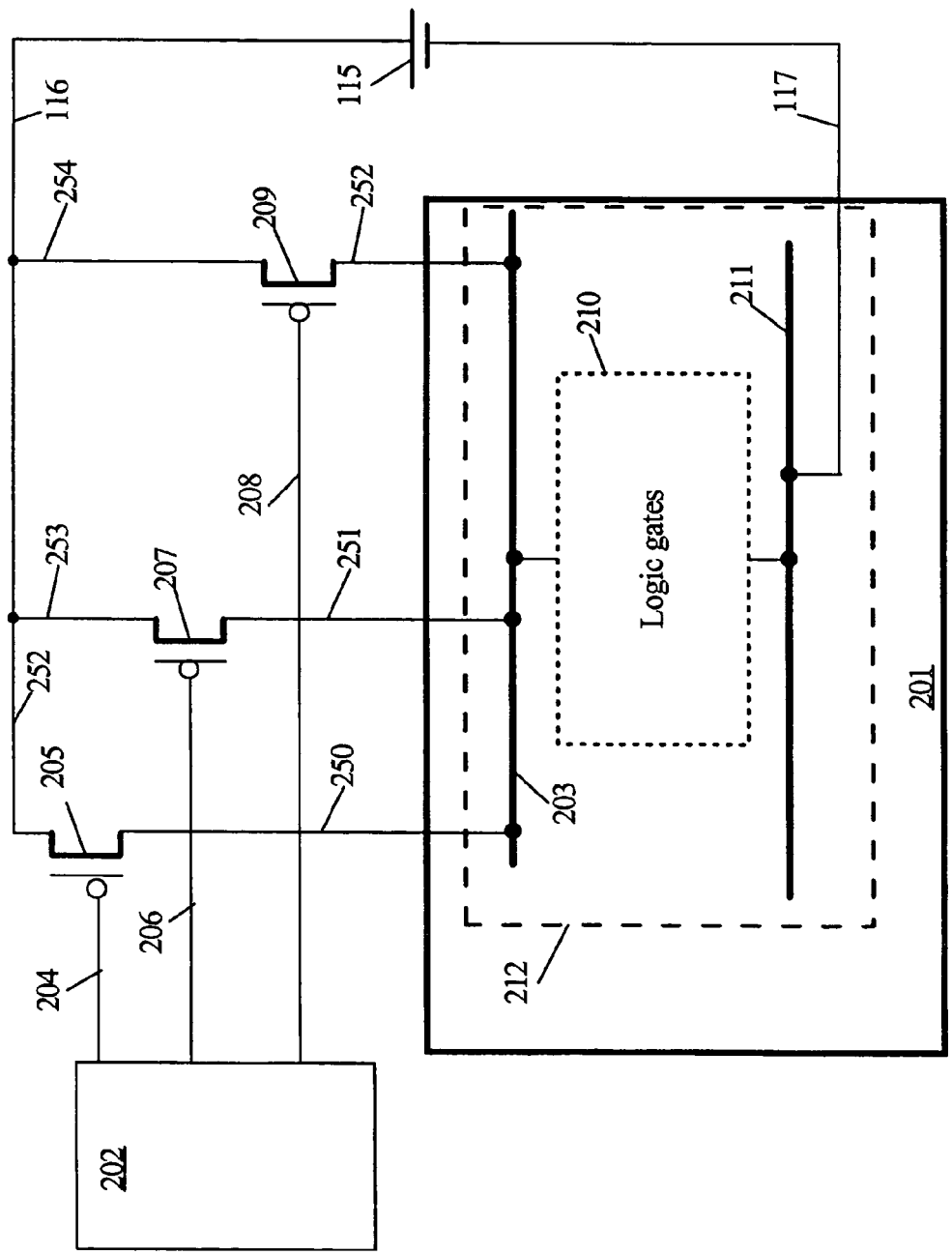
FIG. 2 is a circuit block diagram illustrating a basic topology of embodiments of the present invention for power-gating a virtual positive voltage rail.

FIG. 2 is a block circuit diagram of power-gating according to embodiments of the present invention. A logic circuit domain 201 has a virtual high (positive) power supply rail or bus (VPR) 203 that is coupled to a positive power bus in selected circuits 210. Ground bus 211 of logic gates 210 is coupled directly to ground potential 117 of power supply 115. VPR 203 is coupled to the positive potential 116 of power supply with parallel P channel field effect transistor (PFET) devices 205, 207, and 209 operating as electronic switches. PFETs 205, 207, and 209 have nodes 252-254, respectively, coupled to positive voltage potential 116 and nodes 250-251, respectively, coupled to VPR 203. The PFETs 205, 207, and 209 are gated by logic signals 204, 206, and 208, respectively. Logic signals 204, 206, and 208 are generated in logic domain 202 with non-power-gated circuitry. In this manner, VPR 203 may be coupled to the positive potential 116 with various degrees of conductivity. Large devices have higher conductivity but display higher leakage. Smaller devices have lower conductivity but display lower leakage. Some or all of PFETs 205, 207, and 209 may be gated ON when there is a high degree of switching in domain 201 requiring speed in arriving at a logic output in response to logic inputs. Once an output is determined in domain 201, selective ones of PFETs 205, 207, and 209 may be gated OFF thus reducing leakage power.

FIGS. 1 and 2 show partitioned power-gating applied to only one power supply potential at a time, however, it is understood that embodiments of the present invention may employ partitioned power-gating simultaneously to both power supply potentials for logic circuits in a logic domain (e.g., domain 201).

Figure 3:
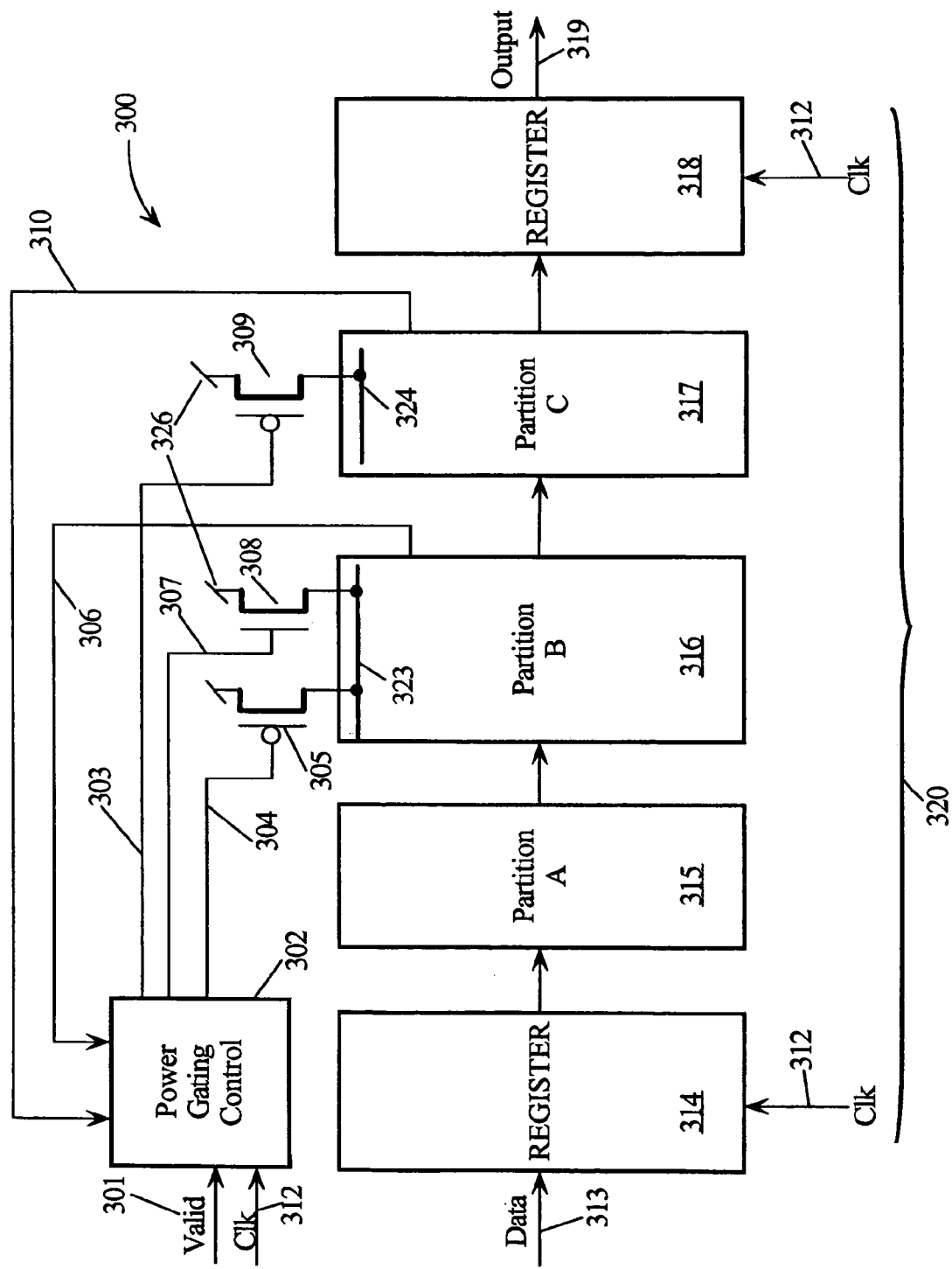
FIG. 3 is a circuit block diagram of pipeline power-gating according to embodiments of the present invention.
Figure 4:
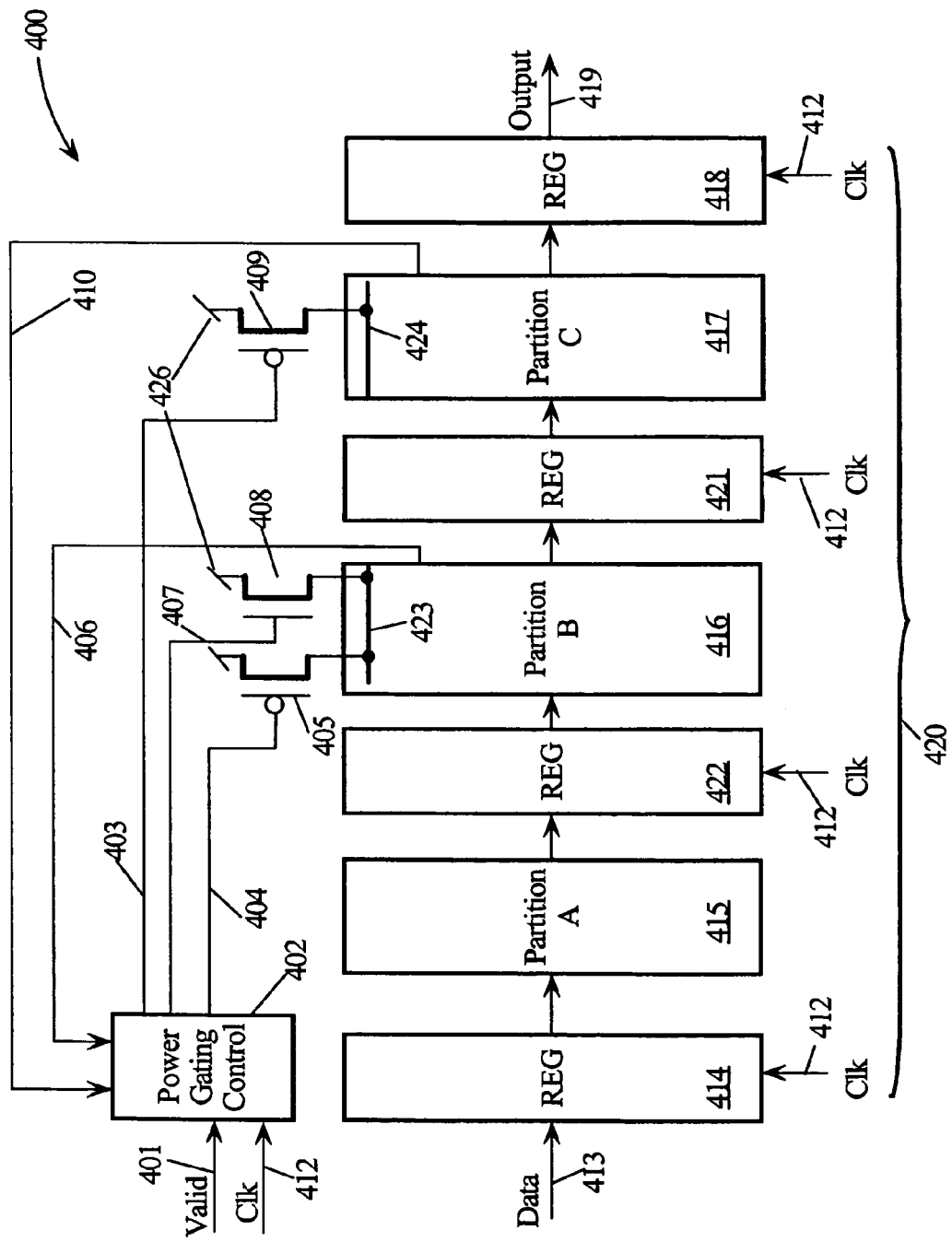
FIG. 4 is a circuit block diagram of pipeline power-gating according to another embodiment of the present invention.
Figure 5:
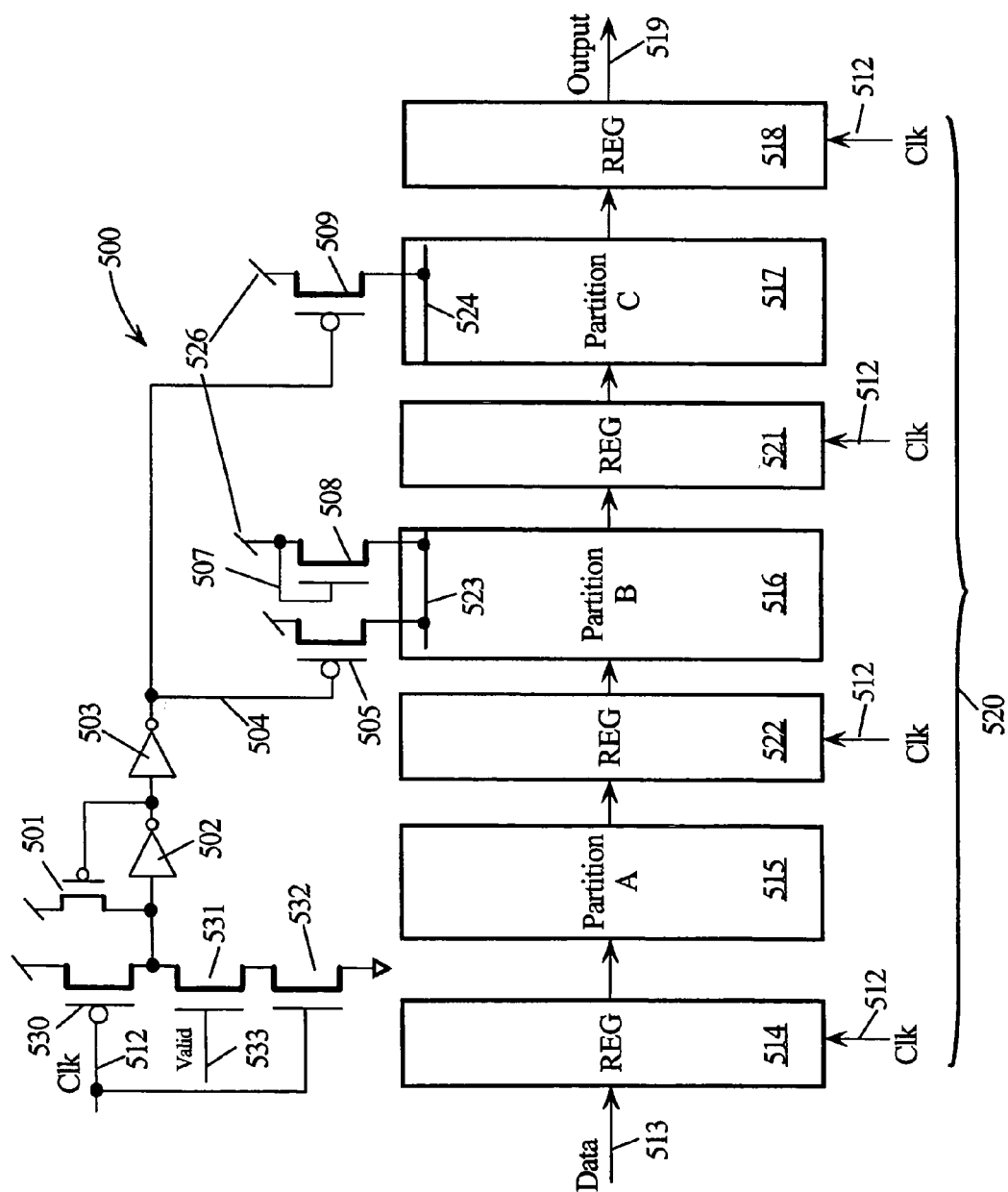
FIG. 5 is a circuit block diagram of pipeline power-gating according to another embodiment of the present invention.

The following FIGS. 3-5 show embodiments of the present invention applied to one power supply bus at a time for simplicity. Likewise, NFETs and PFETs are used as electronic switches to couple power supply potentials to virtual power buses. These NFETs and PFETs have nodes that may not have specific designators as used in FIGS. 1 and 2 for simplicity of the drawings.

FIG. 3 is a circuit block diagram of pipeline power-gating 300 according to embodiments of the present invention. Data 313 is latched into register 314 by clock 312. Processing of data 313 proceeds through the pipeline stage 320 comprising partitions A, B, and C. Partitions A, B, and C are not internally clocked but process data in a ripple through mode. In this embodiment, only the input and output of pipeline stage 320 are clocked. Finally the processed data 313 is latched into register 318 with clock 312. Pipeline 320 is partitioned to allow power-gating according to embodiments of the present invention. It is obvious that logic in partition A processes data 313 before partition B and likewise partition B is needed to process the output of partition A before partition C. Since partition A must act on data 313 first, its logic is not power gated. Partition B has a power bus 323 that is power gated by the action of PFET 305 and NFET 308 and partition C has power bus 324 that is power-gated by PFET 309.

Power gating control 302 receives a valid signal 301 which indicates if the data 313 is valid and can be launched into pipeline stage 320. Partition A can begin processing data 313 immediately upon receipt of a valid signal 301 as its power buses are not power gated. Since there is some time before partition B is needed, its power bus 323 has two levels of power-gating. Since there is not much time to charge its power bus 323, NFET 308 acts as a soft power-gate. When NFET 308 is turned ON by a logic one on control 307, it sets bus 323 at a threshold voltage (Vt) below the voltage potential of power rail 326. Keeping power rail 323 at a slightly lower voltage potential improves leakage while allowing power rail 323 to be quickly charged to the power supply voltage potential when PFET 305 is turned ON by a logic zero on control 304. In this embodiment, control 307 transitions to a logic one before control 304 transitions to a logic one. Partition C is needed last and more time is available to charge power rail 324 from a lower voltage potential so power rail 324 is fully power-gated. Feedback signals 306 and 310 are used to signal power gating control 302 that partition B 316 and partition C 317 have completed processing and may set to their appropriate power-gating states.

FIG. 4 is a circuit block diagram of pipeline power-gating 400 according to another embodiment of the present invention. Data 413 is latched into register 414 by clock 412. Processing of data 413 proceeds through the pipeline stage 420 comprising partition A, B, and C and registers 421 and 422. Registers 422 and 421 are used to hold outputs of partitions A and B. Partitions A, B, and C are not internally clocked but each process data in a ripple through mode. In this embodiment, only the inputs and outputs of the partitions A, B, and C are clocked. Finally the processed data 413 is latched into register 418 with clock 412. Pipeline 420 is partitioned to allow power-gating according to embodiments of the present invention. It is obvious that logic in partition A processes data 413 before partition B and likewise partition B is needed to process the output of partition A before partition C. Since partition A must act on data 413 first, its logic is not power gated. Partition B has a power bus 423 that is power gated by the action of PFET 405 and NFET 408 and partition C has power bus 424 that is power-gated by PFET 409.

Power gating control 402 receives a valid signal 401 which indicates if the data 413 is valid and can be launched into pipeline stage 420. Partition A 415 can begin processing data 413 immediately upon receipt of a valid signal 401 as its power buses are not power gated. Since there is some time before partition B 416 is needed, its power bus 423 has two levels of power-gating. Since there is not much time to charge its power bus 423, NFET 408 acts as a soft power-gate. When NFET 408 is turned ON by a logic one on control 407, it sets bus 423 at a threshold voltage (Vt) below the voltage potential of power rail 426. Keeping power rail 423 at a slightly lower voltage potential improves leakage while allowing power rail 423 to be quickly charged to the power supply voltage potential when PFET 405 is turned ON by a logic zero on control 404. Once processed data has been latched into register 421, partition B, 416 can be power-gated knowing that the output states are latched into a non power-gated register. In this embodiment, control 407 transitions to a logic one before control 404 transitions to a logic one. Partition C 417 is needed last and more time is available to charge power rail 424 from a lower voltage potential so power rail 424 is fully power-gated. Likewise, once the data from partition C 417 has been latched in to register 418, it can be fully power-gated. Feedback signals 406 and 410 are used to signal power gating control 402 that partition B 416 and partition C 417 have completed processing and may set to their appropriate power-gating states.

FIG. 5 is a circuit block diagram of pipeline power-gating 500 according to another embodiment of the present invention. Data 513 is latched into register 514 by clock 512. Processing of data 513 proceeds through the pipeline stage 520 comprising partition A, B, and C and registers 521 and 522. Registers 522 and 521 are used to hold outputs of partitions A and B. Partitions A, B, and C are not internally clocked but each process data in a ripple through mode. In this embodiment, only the inputs and outputs of the partitions A, B, and C are clocked. Finally the processed data 513 is latched into register 518 with clock 512. Pipeline 520 is partitioned to allow power-gating according to embodiments of the present invention. It is obvious that logic in partition A processes data 513 before partition B and likewise partition B is needed to process the output of partition A before partition C. Since partition A must act on data 513 first, its logic is not power gated. Partition B has a power bus 523 that is power gated by the action of PFET 505 and NFET 508 and partition C has power bus 524 that is power-gated by PFET 509.

Power gating control 502 receives a valid signal 501 which indicates if the data 513 is valid and can be launched into pipeline stage 520. Partition A 515 can begin processing data 513 immediately upon receipt of a valid signal 501 as its power buses are not power gated. Since there is some time before partition B 516 is needed, its power bus 523 has two levels of power-gating. Since there is not much time to charge its power bus 523, NFET 508 acts as a soft power-gate that is self biased ON all the time. NFET 508 is always on and it sets bus 523 at a threshold voltage (Vt) below the voltage potential of power rail 526 when PFET 505 is turned OFF by a logic one on control 504. Keeping power rail 523 at a slightly lower voltage potential improves leakage while allowing power rail 523 to be quickly charged to the power supply voltage potential when PFET 505 is turned ON by a logic zero on control 504. Once processed data has been latched into register 521, partition B 516 can be power-gated knowing that the output states are latched into a non power-gated register. Partition C 517 is needed last and more time is available to charge power rail 524 from a lower voltage potential so power rail 524 is fully power-gated by PFET 509 which also is controlled by control 504. Likewise, once the data from partition C 517 has been latched in to register 518, it can be fully power-gated.

When Valid 533 is a logic one and Clk 512 transitions to a logic one, NFETs 531 and 532 turn ON pulling the input to inverter 502 to a logic zero and the output of inverter 503 to a logic zero turning ON both PFET 505 and 509 thereby charging power rails 523 and 524 to full power supply potential. Since power rail 524 may be fully discharged it takes longer to charge. When Clk 512 transitions to a logic zero, it turns ON PFET 530 and pulls input of inverter 502 to a logic one causing its output to transition to a logic zero turning ON keeper PFET 501 which latches the logic one state at the input of inverter 502 and at the output of inverter 503. This turns OFF both PFET 505 and PFET 509. Power rail 523 is soft power-gated as NFET 508 is biased ON setting power rail 523 at threshold voltage Vt below the full power supply potential at power rail 526 and power rail 524 is turned fully OFF.

Figure 6:
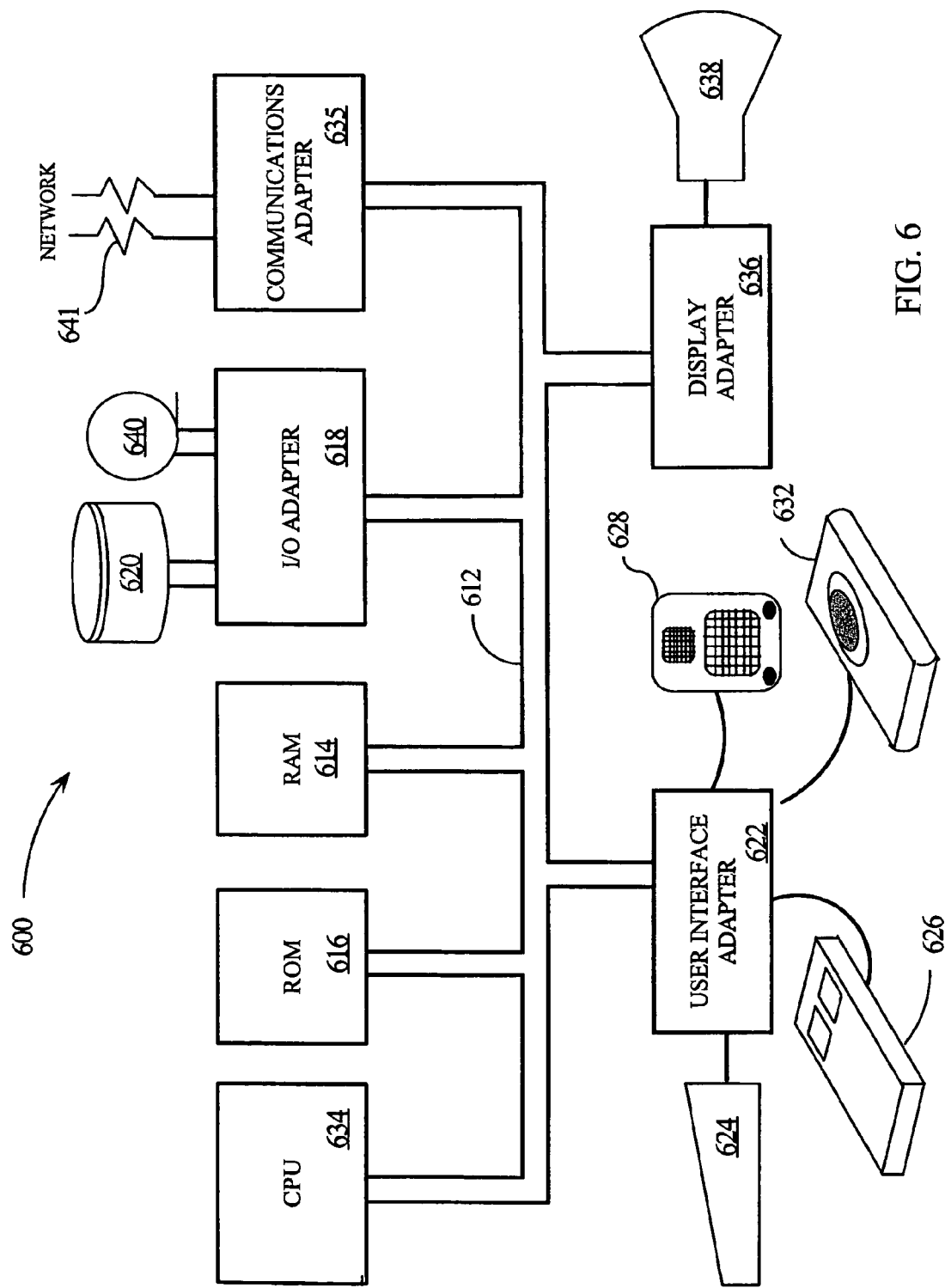
FIG. 6 is a data processing system suitable for practicing embodiments of the present invention.

FIG. 6 is a high level functional block diagram of a representative data processing system 600 suitable for practicing the principles of the present invention. Data processing system 600 includes a central processing system (CPU) 610 operating in conjunction with a system bus 612. System bus 612 operates in accordance with a standard bus protocol, such as the ISA protocol, compatible with CPU 610. CPU 610 operates in conjunction with electronically erasable programmable read-only memory (EEPROM) 616 and random access memory (RAM) 614. Among other things, EEPROM 616 supports storage of the Basic Input Output System (BIOS) data and recovery code. RAM 614 includes DRAM (Dynamic Random Access Memory) system memory and SRAM (Static Random Access Memory) external cache. I/O Adapter 618 allows for an interconnection between the devices on system bus 612 and external peripherals, such as mass storage devices (e.g., a hard drive, floppy drive or CD/ROM drive), or a printer 640. A peripheral device 620 is, for example, coupled to a peripheral control interface (PCI) bus, and 110 adapter 618 therefore may be a PCI bus bridge. User interface adapter 622 couples various user input devices, such as a keyboard 624 or mouse 626 to the processing devices on bus 612. Display 638 which may be, for example, a cathode ray tube (CRT), liquid crystal display (LCD) or similar conventional display units. Display adapter 636 may include, among other things, a conventional display controller and frame buffer memory. Data processing system 600 may be selectively coupled to a computer or telecommunications network 641 through communications adapter 634. Communications adapter 634 may include, for example, a modem for connection to a telecom network and/or hardware and software for connecting to a computer network such as a local area network (LAN) or a wide area network (WAN). CPU 610 and other components of data processing system 600 may contain pipeline circuitry that is pipeline power-gated according to embodiments of the present invention to manage leakage current and thus leakage power.

What is claimed is:

1. A low power consumption leakage pipeline circuit architecture comprising:
   a clock responsive input latch coupled to latch input data;
   a non-power-gated first pipeline stage for processing the latched input data and generating first processed output data;
   a power-gated second pipeline stage for processing the first processed output data and generating second processed output data, the power-gated second pipeline stage switching to power-gated states in response to a first control signal;
   a power-gated third pipeline stage for processing the second processed output data and generating third processed output data, the power-gated third pipeline stage switching to power-gated states in response to a second control signal; and
   a clock responsive output latch coupled to the third processed output data, wherein a power rail in the power-gated second pipeline stage is effectively coupled to a pipeline power supply before a power rail in the power-gated third pipeline stage, and wherein the power-gated second pipeline stage switches to a first power-gated state in response to a second logic state of the first control signal and the second logic state of a third control signal and switches to a second power-gated state in response to the second logic state of the first control signal and a first logic state of the third control signal.

2. The pipeline circuit architecture of claim 1, wherein a power rail in the power-gated second pipeline stage is decoupled from a first voltage potential of the pipeline power supply in the first power-gated state and the power rail in the power-gated second pipeline stage is charged to a second voltage potential a threshold voltage below the first voltage potential of the pipeline power supply in the second power-gated state.

3. The pipeline circuit architecture of claim 2, wherein the power rail in the power-gated second pipeline stage is coupled to the first voltage potential by a first switching device in response to the first control signal and coupled to the first voltage potential by a second switching device in response to the third control signal.

4. The pipeline circuit architecture of claim 3, wherein first switching device is a PFET having a gate coupled to the first control signal, a source coupled to the first voltage potential of the power supply and a drain coupled to the power rail of the second pipeline stage.

5. The pipeline circuit architecture of claim 4, wherein the second switching device is an NFET having a gate coupled to the third control signal, a source coupled to the power rail of the second pipeline stage and a drain coupled to the first voltage potential of the power supply.

6. The pipeline circuit architecture of claim 2, wherein the power rail in the power-gated second pipeline stage is coupled to the first voltage potential by a first switching device in response to the first control signal and continuously coupled to the first voltage potential by a self biased second switching device.

7. The pipeline circuit architecture of claim 6, wherein first switching device is a PFET having a gate coupled to the first control signal, a source coupled to the first voltage potential of the power supply and a drain coupled to the power rail of the second pipeline stage.

8. The pipeline circuit architecture of claim 6, wherein the second switching device is an NFET having a gate coupled to its source and a drain coupled to the first voltage potential of the pipeline power supply.

9. The pipeline circuit architecture of claim 1, wherein the first and second control signals are set to the first logic state in response to a valid signal logic state indicating that the input data is valid for processing.

10. The pipeline circuit architecture of claim 9, wherein the power gated second pipeline stage and the power gated third pipeline stage generate feedback signals indicating they have completed processing.

11. The pipeline circuit architecture of claim 10, wherein the first and second control signals are generated in response to the feedback signals and the valid signal.

12. A low power consumption leakage pipeline circuit architecture comprising:
  a clock responsive input latch coupled to latch input data;
  a non-power-gated first pipeline stage for processing the latched input data and generating first processed output data;
  a power-gated second pipeline stage for processing the first processed output data and generating second processed output data, the power-gated second pipeline stage switching to power-gated states in response to a first control signal;
  a power-gated third pipeline stage for processing the second processed output data and generating third processed output data, the power-gated third pipeline stage switching to power-gated states in response to a second control signal; and
  a clock responsive output latch coupled to the third processed output data, wherein a power rail in the power-gated second pipeline stage is effectively coupled to a pipeline power supply before a power rail in the power-gated third pipeline stage, wherein a power rail in the power-gated third pipeline stage is decoupled from the first voltage potential in the first power gated state, and wherein the power rail in the power-gated third pipeline stage is coupled to the first voltage potential by a third switching device in response to the first logic state of the second control signal and coupled to the first voltage potential by the third switching device in response to the second logic state of the second control signal.

13. The pipeline circuit architecture of claim 12, wherein third switching device is a PFET having a gate coupled to the second control signal, a source coupled to the first voltage potential of the pipeline power supply and a drain coupled to the power rail of the third pipeline stage.

14. A data processing system comprising:
  a central processing system (CPU) coupled to a memory for storing data and a program of instructions, the CPU with one or more pipelines with a low power consumption pipeline architecture having a clock responsive input latch coupled to latch input data, a non-power-gated first pipeline stage for processing the latched input data and generating first processed output data, a power-gated second pipeline stage for processing the first processed output data and generating second processed output data, the power-gated second pipeline stage switching to power-gated states in response to a first control signal, a power-gated third pipeline stage for processing the second processed output data and generating third processed output data, the power-gated third pipeline stage switching to power-gated states in response to a second control signal, and a clock responsive output latch coupled to the third processed output data, wherein a power rail in the power-gated second pipeline stage is effectively coupled to a pipeline power supply before a power rail in the power-gated third pipeline stage, and wherein the power-gated second pipeline stage switches to a first power-gated state in response to a second logic state of the first control signal and the second logic state of a third control signal and switches to a second power-gated state in response to the second logic state of the first control signal and a first logic state of the third control signal.

15. The data processing system of claim 14, wherein a power rail in the power-gated second pipeline stage is decoupled from a first voltage potential of the pipeline power supply in the first power-gated state and the power rail in the power-gated second pipeline stage is charged to a second voltage potential a threshold voltage below the first voltage potential of the pipeline power supply in the second power-gated state.

16. The data processing system of claim 15, wherein the power rail in the power-gated second pipeline stage is coupled to the first voltage potential by a first switching device in response to the first control signal and coupled to the first voltage potential by a second switching device in response to the third control signal.

17. The data processing system of claim 16, wherein first switching device is a PFET having a gate coupled to the first control signal, a source coupled to the first voltage potential of the pipeline power supply and a drain coupled to the power rail of the second pipeline stage.

* * * * *